United States Patent Office 3,584,012
Patented June 8, 1971

3,584,012
OLEANDOMYCIN FERMENTATION RECOVERY
Walter D. Celmer and James W. Wadlow, Jr., New London, Conn., assignors to Chas. Pfizer & Co., Inc., New York, N.Y.
No Drawing. Filed Sept. 20, 1968, Ser. No. 761,317
Int. Cl. C07d 9/00
U.S. Cl. 260—343     5 Claims

ABSTRACT OF THE DISCLOSURE

Yields of oleandomycin from fermentation broths are greatly improved by adjusting the fermentation broth to a pH of from about 5 to about 6 with mineral acid during the post-fermentation period and maintaining said pH for at least two hours.

BACKGROUND OF THE INVENTION

This invention relates generally to an improvement in the oleandomycin fermentation process. More particularly, it relates to a process modification in the recovery step of the oleandomycin fermentation process which enables a marked improvement in product yield.

Oleandomycin is a relatively new, useful and well characterized antibiotic which is prepared commercially by a fermentation process. The antibiotic is formed during the cultivation under controlled conditions of a strain of a species of microorganism known as *Streptomyces antibioticus*. The cultivation of this microorganism preferably takes place in aqueous nutrient media at a temperature of about 24–30° C., and under submerged conditions of agitation and aeration. The growth of the microorganism usually reaches its maximum in about two or three days. Aseptic conditions must, of course, be maintained throughout the transfer of the inoculum and throughout the growth of the microorganism.

After growth of the microorganism, the mycelium which is generally quite luxuriant and fine, may be removed from the fermentation broth by various standard equipment, such as filter-presses, centrifuges, etc. The oleandomycin may be recovered from fermentation broth by several different procedures. Alternatively, the whole broth may be used as is or it may be dried. Generally, the antibiotic is ultimately purified by extracting from an aqueous solution at alkaline pH's by means of a variety of water-immiscible organic solvents. Upon drying the organic solvent phase and concentrating, the antibiotic crystallizes.

SUMMARY OF THE INVENTION

The present invention relates to a process innovation for recovering oleandomycin from a fermentation broth which comprises adjusting the pH of the fresh post-fermentation broth with mineral acid to a range of about pH 5 to about 6 and maintaining such pH for at least 2 hours before separating out the oleandomycin product.

A particularly preferred embodiment of the above described process uses sulfuric acid as the acidifying medium and makes the pH adjustment directly on the fermentation broth.

DETAILED DESCRIPTION OF THE INVENTION

The novel process innovation which forms the subject matter of this invention may be performed directly on the fermentation broth containing mycelium or on the fermentation broth after the removal of said mycelium. It is carried out prior to the purification, which is the next step in the recovery process of the product, oleandomycin.

It has been found that a biologically inactive substance which is referred to as oleandomycin-X appears to be the principal compound formed during the course of the oleandomycin fermentation. It is formed during the early stages of the fermentation process and continues to be produced throughout, remaining in equilibrium with oleandomycin. At the time the fermentor is shut down, with the broth at or above about 6.5 pH, oleandomycin-X comprises approximately 75 to 90% of the material present which is nominally, chemically assayed as oleandomycin. Oleandomycin-X is converted by some enzymatic process, the mechanism of which is not completely understood at this time, to oleandomycin within hours after the fermentor is shut down. The rate of conversion of oleandomycin-X to oleandomycin is dependent on the pH of the broth and appears to be most rapid (about 2 hours) between pH 5.0 and pH 6.0. Herein lies the inventive feature of the subject disclosure.

Since oleandomycin-X is biologically inactive, it follows that maximum yields of desired product will be obtained if the conversion of oleandomycin-X to oleandomycin is virtually complete. This can be accomplished by adjusting the pH of the completed fermentation broth to a pH of about 5.5 with sulfuric acid and maintaining such pH for at least about two hours and then recovering the product. Since the ultimate pH range is critical and not the means by which it is effected, any mineral acid will suffice. For purposes of this invention, however, it has been found that sulfuric acid is most preferred. Other acids such as HCl, HBr and $H_3PO_4$ can also be used on a comparable basis.

Once the subject conversion is complete, the oleandomycin is recovered from filtered or unfiltered broth in the usual manner as described earlier.

The following examples are given to more fully illustrate the instant invention. They are not the only possible embodiments of the invention and are not to be considered as a limitation on the scope thereof.

Example I

A slant of *S. antibioticus* ATCC 11891 on Emerson agar is cultivated under controlled conditions to develop spores for the purpose of inoculating a nutrient medium of the following composition:

| | Grams |
|---|---|
| Cerelose (dextrose hydrate) | 10 |
| Soybean meal | 10 |
| Sodium chloride | 5 |
| Distillers' solubles | 5 |
| Calcium carbonate | 1 |

The mixture of nutrients is diluted to a volume of one liter with water, adjusted to a pH of 7 with potassium hydroxide, and subjected to heat sterilization. Thereafter, the medium is cooled and the spores are added thereto under aseptic conditions. The cultivation of the organism is conducted in shaken flask at about 25° C. for a period of 2 days. The mixture of broth and mycelium thus formed is then transferred to 20 times its volume of a sterile fermentation medium having the following composition:

| | Grams/liter |
|---|---|
| Cerelose (dextrose hydrate) | 10 |
| Sodium chloride | 5 |
| Curbay Bg (molasses residue) | 5 |
| Corn starch | 10 |
| Soybean meal | 10 |

This medium is adjusted to pH 7 with KOH, treated with 1 gm. of $CaCO_3$ per liter, and sterilized in the usual manner before transferring the broth and mycelium thereto. After seeding the medium with the organism from the shaken flasks, the mixture is subjected to agitation and aeration under sterile conditions for 3 days. To the resulting broth is added 50% $H_2SO_4$ in sufficient quantity to acidify the mixture to approximately 5.5 pH. The mixture is maintained at this pH for 2 hours.

Upon completion of this time period, the broth is made slightly alkaline with 10% NaOH and the antibiotic is then extracted into methyl isobutyl ketone (¼ volume) and back into water (¼ volume) adjusted to a pH of about 2.5 with 50% $H_2SO_4$. The aqueous phase is separated and adjusted to a slightly alkaline pH with 10% NaOH. Thereafter the antibiotic is extracted several times with chloroform and dried over anhydrous sodium sulfate. Removal of the chloroform by distillation results in crystallization of the antibiotic.

Example II

The procedure of Example I is repeated except the broth is filtered to remove the mycelium before the addition of the sulfuric acid. Comparable results are obtained.

Example III

The following procedure was undertaken to illustrate the dependence of oleandomycin yields on pH adjustment. From a typical oleandomycin fermentation broth (e.g. as obtained by Example I), 50 ml. portions are removed and various quantities of 50% $H_2SO_4$ are added in order to instantly attain a variety of fixed pH levels. Thin layer chromatographs (TLC) are run on extracts from these portions made at 2 hours and 48 hours. Bio assays are run on the 48 hour samples. The results are given below:

| Sample | ml. broth | Ml. $H_2SO_4$ | Trial pH | 2 hr. TLC, O—X/O | 48 hr. TLC, O—X/O | 48 hr. bio assay |
|---|---|---|---|---|---|---|
| 1 | 50 | 0 | 7.5 | 5/2 | 3/3 | 2,650 |
| 2 | 50 | 0.3 | 6.0 | 1/4 | 1/3 | 2,650 |
| 3 | 50 | 0.4 | 3.5 | 5/1 | 4/1 | <1,000 |
| 4 | 50 | 1.0 | 0.8 | 5/1 | 4/1 | <1,000 |
| 5 | 50 | 1.5 | 0.6 | 5/1 | 4/1 | <1,000 |

TLC spots are evaluated numerically according to the following scale:

5=Very heavy
4=Heavy
3=Moderate
2=Light
1=Very light
0=None

It is evident that yields of oleandomycin are greater at a pH level adjustment of 6.0. Furthermore, continuing low bio assays for the low pH samples (4–6) indicate that compound O—X which is biologically inactive remained unconverted to oleandomycin.

Example IV

The procedure of Example III is repeated wherein the broth samples are filtered to remove mycelium and other insolubles prior to treatment with $H_2SO_4$. Similar results are obtained.

Example V

The procedure of Example I is repeated wherein the following mineral acids are used in lieu of sulfuric acid in stoichiometric equivalent amounts with comparable results:

$HCl, HBr, H_3PO_4$

What is claimed is:
1. In the process for recovering oleandomycin from a fermentation broth, the improvement which comprises adjusting the pH of the fresh post-fermentation broth with mineral acid to a range of about pH 5 to about 6 and maintaining such pH for at least 2 hours before separating out the oleandomycin product.
2. The process of claim 1 wherein said mineral acid is added directly to the fermentation broth.
3. The process of claim 1 wherein prior to the addition of mineral acid, the mycelium is removed from the fermentation broth.
4. The process of claim 1 wherein a pH of 5.5 is maintained for a period of about 2 hours.
5. The process of claim 1 wherein said mineral acid is sulfuric acid.

References Cited

UNITED STATES PATENTS 2,757,123   7/1956   Sobin et al. _____ 195—80X
2,842,481   7/1958   Ratajak et al. _____ 195—80X

OTHER REFERENCES

Hochstein et al.: J. Am. Chem. Soc., vol. 82, pp. 3225–7 (1960).

JOHN M. FORD, Primary Examiner

U.S. Cl. X.R.

195—80; 260—999

UNITED STATES PATENT OFFICE
CERTIFICATE OF CORRECTION

Patent No. 3,584,012          Dated June 8, 1971

Inventor(s) Walter D. Celmer et al.

It is certified that error appears in the above-identified patent and that said Letters Patent are hereby corrected as shown below:

In the heading to the printed specification, lines 4 and 5, "Chas. Pfizer & Co., Inc., New York, N. Y." should read -- Pfizer Inc., New York, N. Y. --.

Signed and sealed this 10th day of August 1971.

(SEAL)
Attest:

EDWARD M. FLETCHER, JR.         WILLIAM E. SCHUYLER, JR.
Attesting Officer               Commissioner of Patents